INVENTOR.
WILLIAM B. SEIDEL
BY
ATTORNEYS

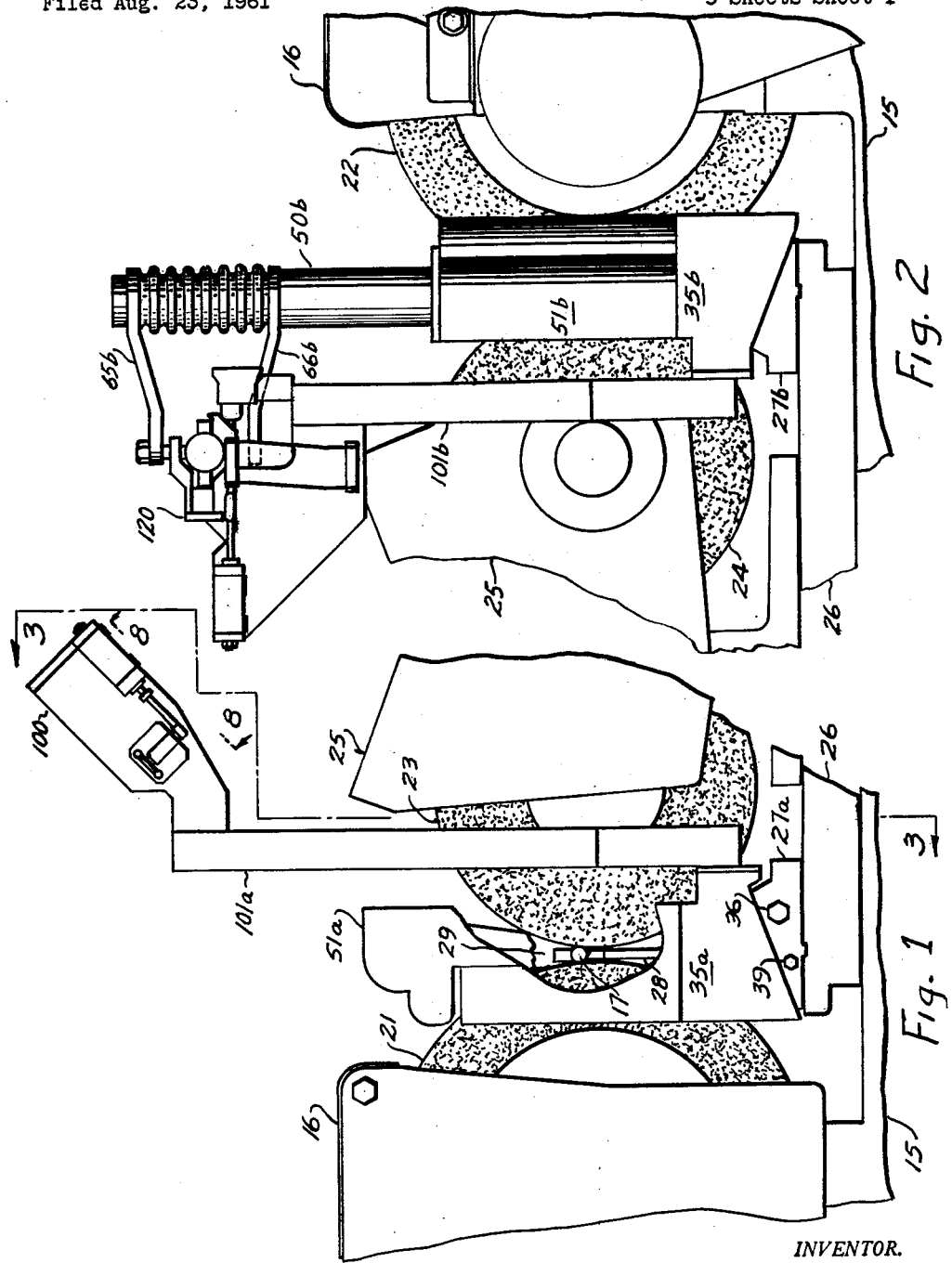

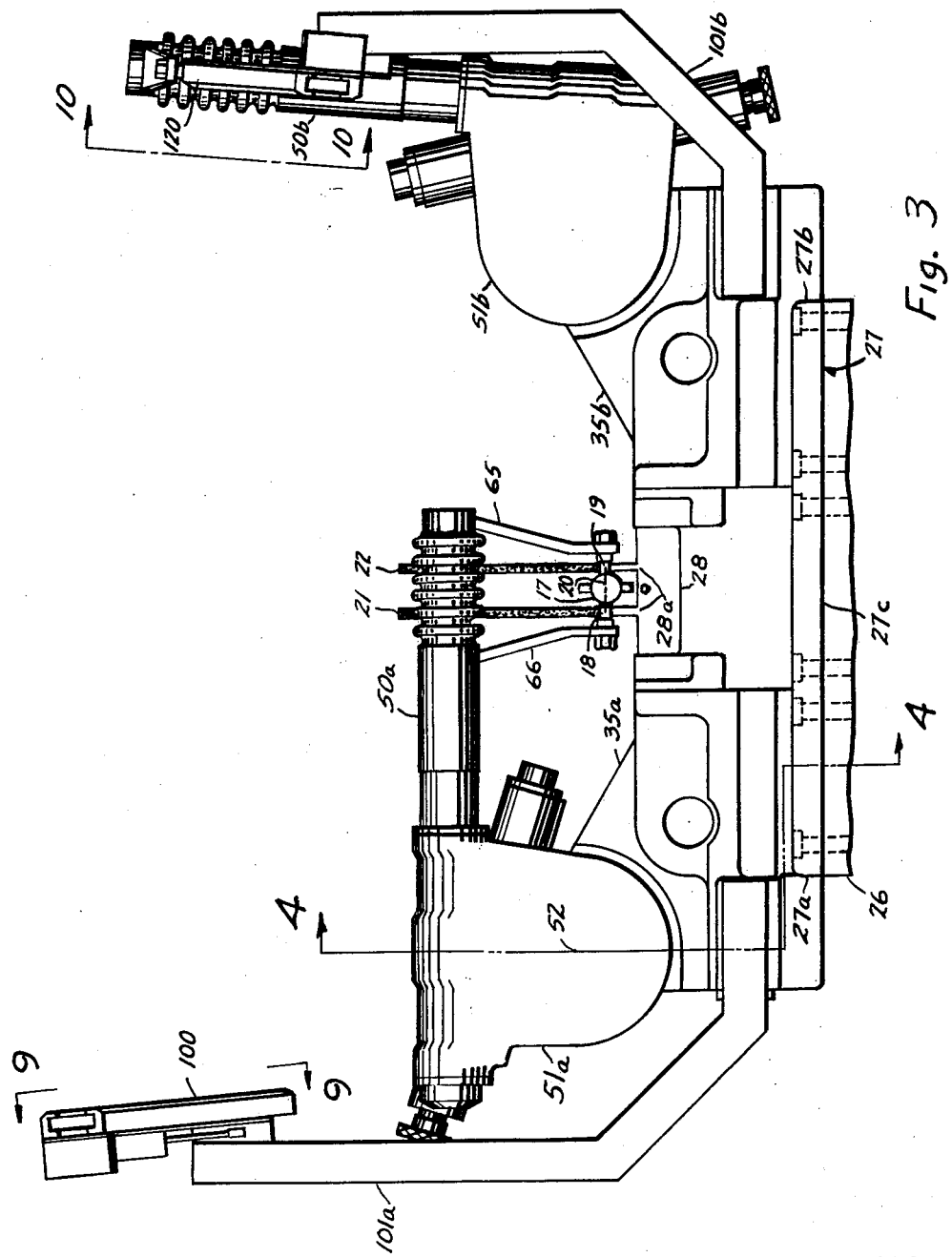

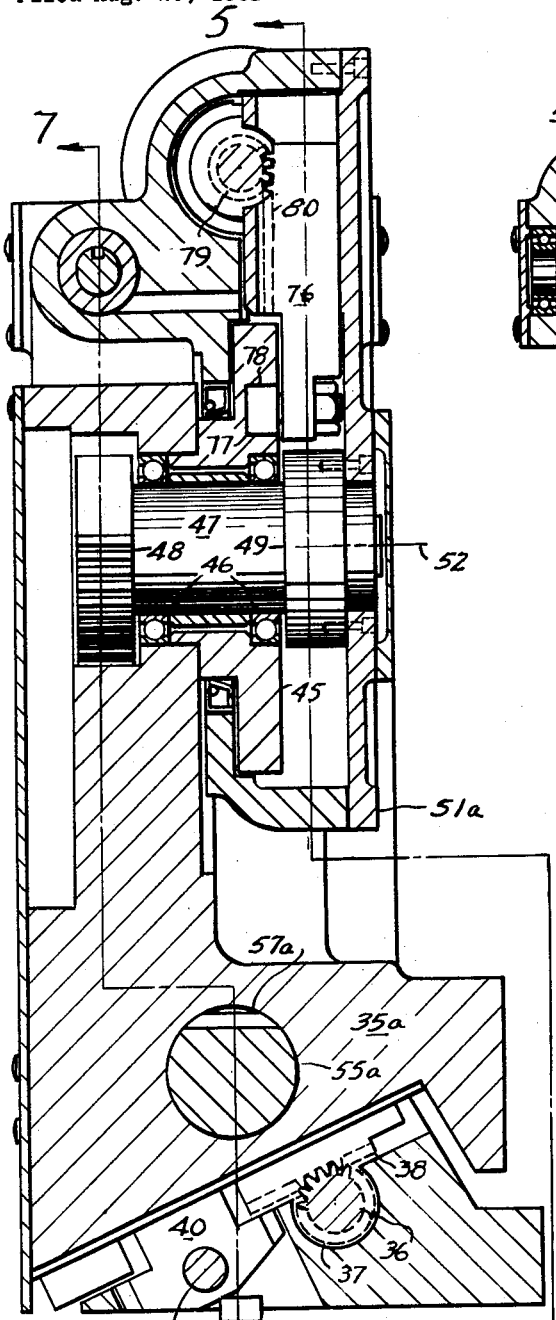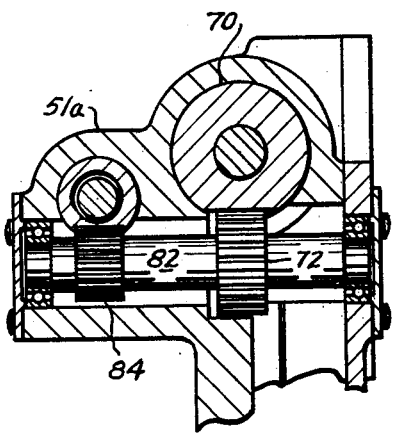
Fig. 6
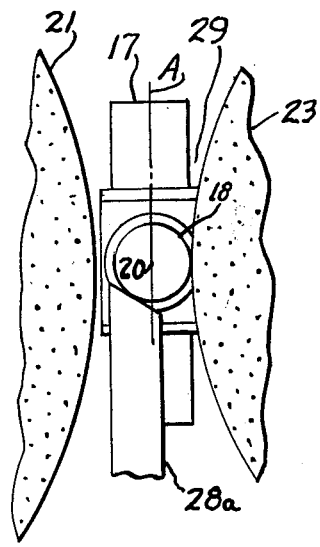
Fig. 14
Fig. 4
INVENTOR.
WILLIAM B. SEIDEL
BY
ATTORNEYS Jan. 29, 1963 W. B. SEIDEL 3,075,321
WORKPIECE HANDLING MECHANISM FOR CENTERLESS GRINDER
Filed Aug. 23, 1961 9 Sheets-Sheet 4

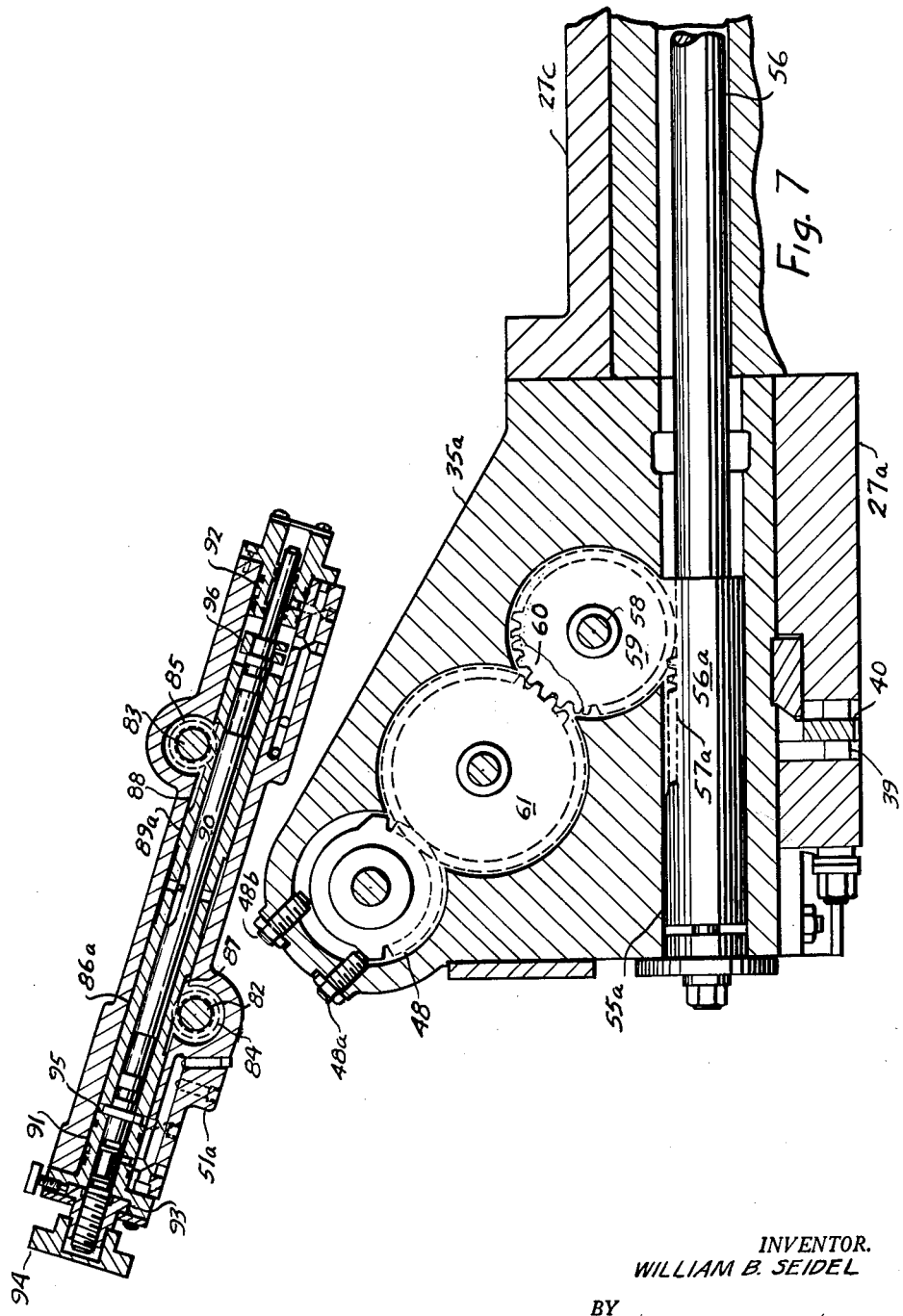

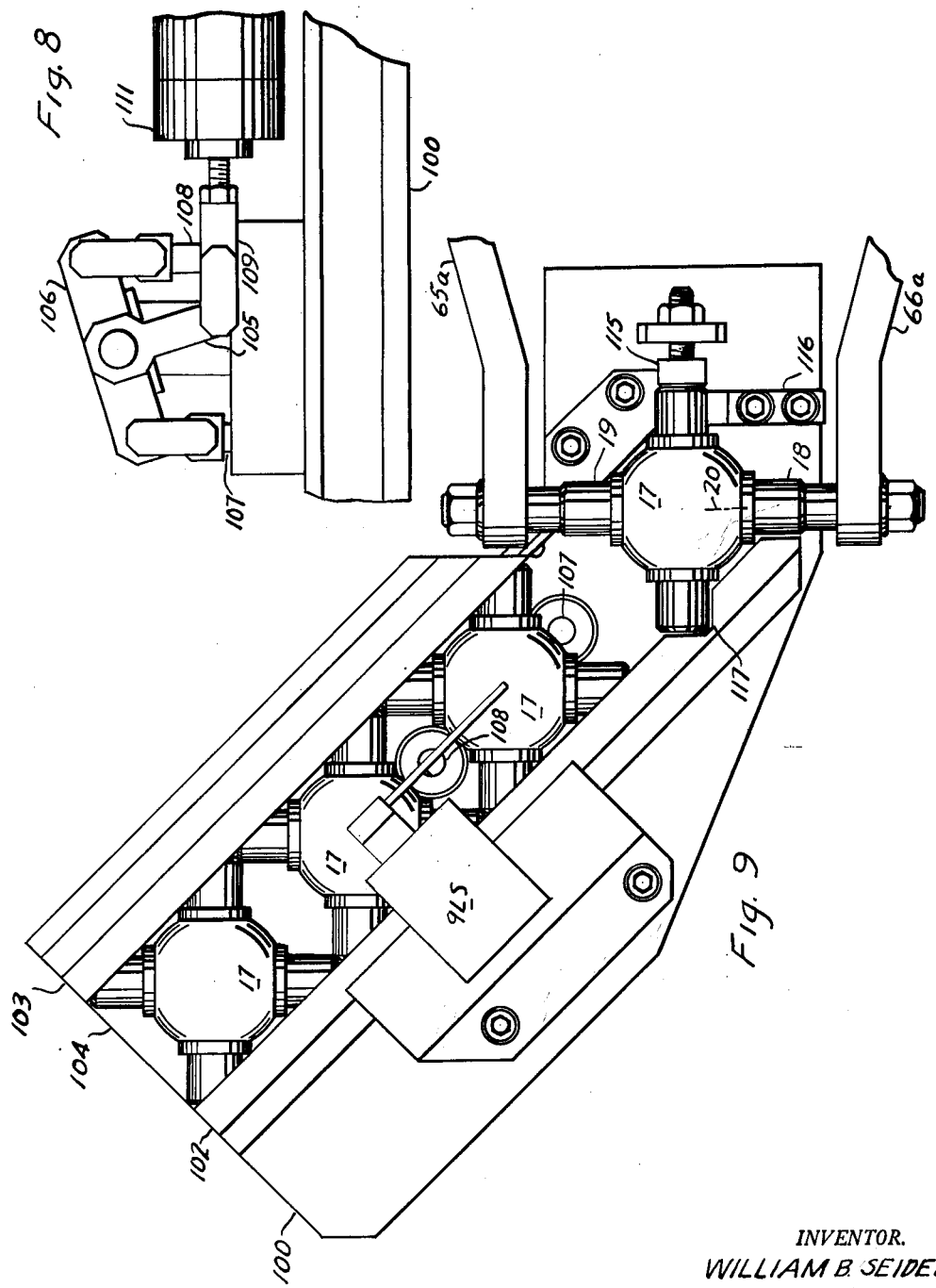

Jan. 29, 1963 W. B. SEIDEL 3,075,321
WORKPIECE HANDLING MECHANISM FOR CENTERLESS GRINDER
Filed Aug. 23, 1961 9 Sheets-Sheet 7
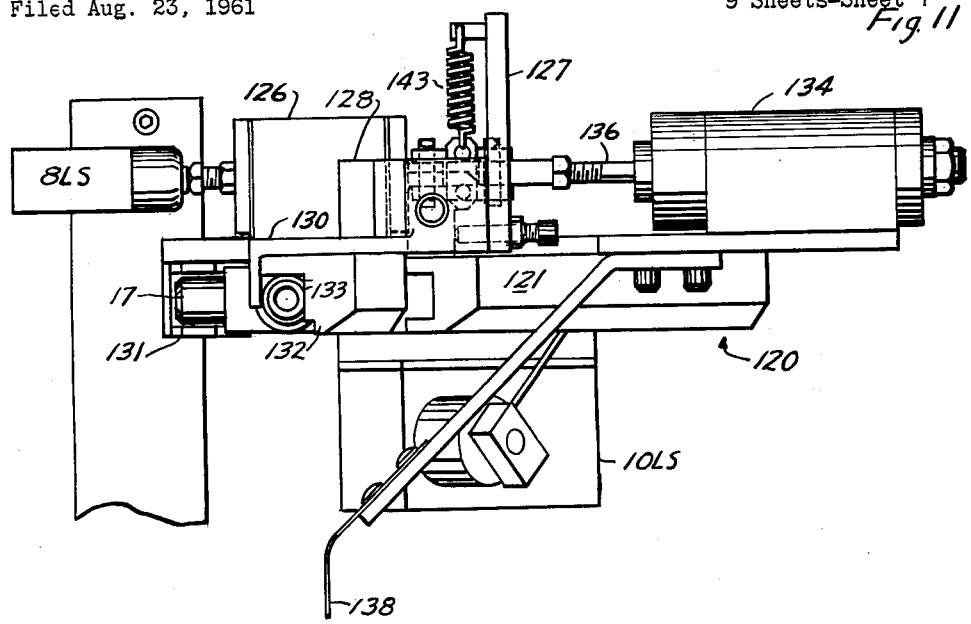
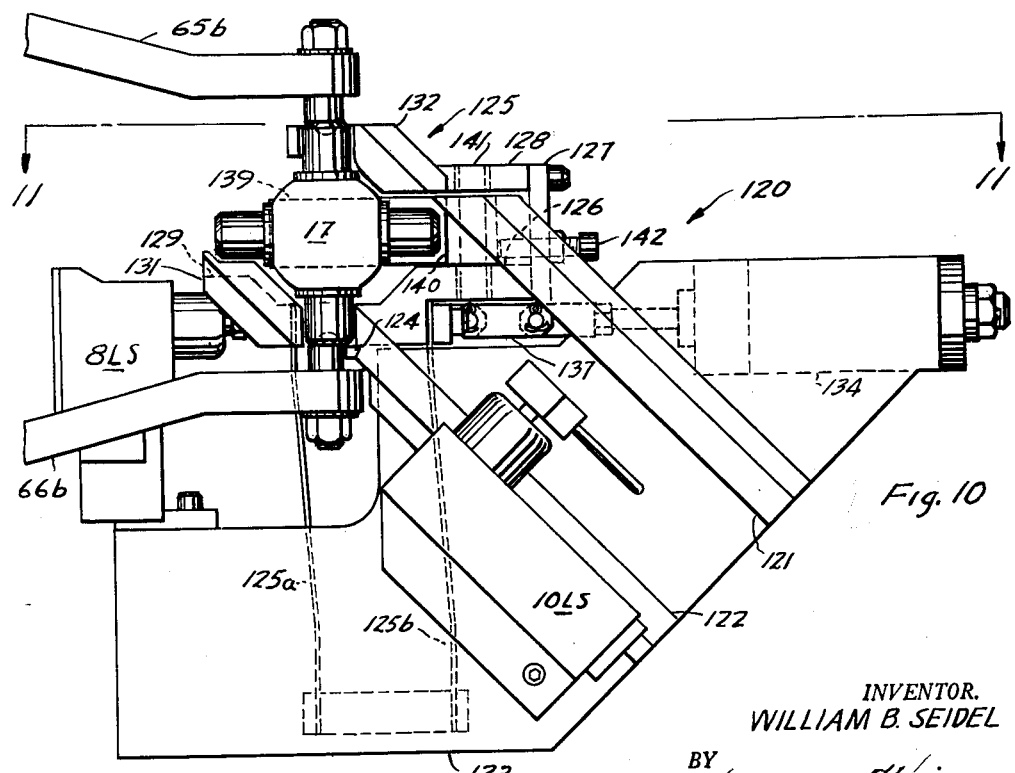
INVENTOR.
WILLIAM B. SEIDEL
ATTORNEYS Jan. 29, 1963  W. B. SEIDEL  3,075,321
WORKPIECE HANDLING MECHANISM FOR CENTERLESS GRINDER
Filed Aug. 23, 1961  9 Sheets-Sheet 8

INVENTOR.
WILLIAM B. SEIDEL
BY
ATTORNEYS

United States Patent Office

3,075,321
Patented Jan. 29, 1963

3,075,321
WORKPIECE HANDLING MECHANISM FOR CENTERLESS GRINDER
William B. Seidel, Cincinnati, Ohio, assignor to The Cincinnati Milling Machine Co., Cincinnati, Ohio, a corporation of Ohio
Filed Aug. 23, 1961, Ser. No. 133,358
12 Claims. (Cl. 51—103)

The present invention relates to a centerless grinding machine and more particularly to a workpiece handling mechanism therefor for rapid loading and unloading of the machine in repetitive plunge grind operations.

In many loading mechanisms for repetitive plunge grind operations in a centerless grinding machine, a workpiece is moved axially on a blade into the grinding throat (defined by the grinding wheel and the opposed regulating wheel) to a predetermined position therein. After the workpiece is positioned, the throat is contracted by moving one or the other of said wheels toward the opposite wheel to effect the grind, and then expanded to permit removal of the workpiece, frequently by a mechanism which ejects the workpiece out to a finished workpiece receiving chute on the same side of the throat from which the unoperated workpiece was received into the throat. This type of mechanism is not suitable for loading and unloading a workpiece which, because of its shape, cannot be moved axially (that is, moved in the direction of the axis about which it is to be rotated for grinding) along the blade. Moreover, simultaneous loading and unloading of workpieces, which is important for rapid, repetitive, grinding operations, is difficult in any centerless grinder loading and unloading mechanism where the workpiece is loaded from, and unloaded to, the same side of the grinding throat, since interference between the unoperated workpiece or the mechanism provided to load the unoperated workpiece, and the operated workpiece or the mechanism provided to unload the operated workpiece, must be avoided.

Fingers which move vertically down to and up from the blade in the grinding throat have been utilized in loading mechanisms, but many of these mechanisms transport a workpiece with interrupted movement, or move the worpiece in irregular paths, making rapid movement with full control of the workpiece difficult. In some centerless grinding operations, ejection of the finished, or operated, workpiece is effected by expanding the grinding throat sufficiently to permit the workpiece to drop off the blade and down between the wheels. Any time consumed in expanding the throat on each operation is unavailable for grinding, and expansion of the throat to an extent to drop pieces out the bottom thereof will result in a lower rate of repetitive grinding than can be achieved if less throat expansion is necessary for loading and unloading the workpieces.

There is provided in the present invention an improved mechanism which loads unoperated workpieces from one side of the grinding throat of a centerless grinder as it simultaneously unloads operated workpieces from the other side thereof. Each unoperated workpiece is swung down onto the blade in a predetermined position in the grinding throat, and each operated workpiece is swung up off the blade from this position so that workpieces which can not slide along the blade can be handled as readily as cylindrical workpieces. This is accomplished by providing two arms, one a loading arm and the other an unloading arm, each pivotal to swing about one end, on opposite sides of the grinding throat in unison, the arms being coordinated in their movement so that as the opposite, or free, end of one arm swings toward the grinding throat, on one side thereof, the opposite, or free, end of the other arm swings away from the grinding throat on the other side thereof.

Each arm has a workpiece support extending from its free end which, in the preferred form of the invention, comprises a pair of fingers spaced along the arm and relatively movable to close on, or release, the ends of a workpiece. Both arms swing on supports in predetermined paths, preferably in a common vertical plane extending through the grinding throat. On the side of the grinding throat on which the loading arm swings in its predetermined path, a loading chute is provided out of the path of the arm and, on the opposite side of the grinding throat, an unloading chute is provided out of the path of the unloading arm. Each workpiece support pivots on its arm between a position in the plane of the arms (when the arm is at the throat) and a position out of the plane of the arms (when the arm is at the chute). The workpiece support of the loading arm pivots out of the plane through the grinding throat so that, when the loading arm reaches its extreme position of travel away from the grinding throat, the workpiece support is in a workpiece receiving position to take a piece from the loading chute which is spaced from the plane in which the arm swings. As the loading arm is moved toward the grinding throat the workpiece support is pivoted into the plane of the arms so that when the arm reaches its opposite extreme position above the grinding throat, the workpiece support, or fingers, extend down to the blade to deposit the workpiece thereon with minimum expansion of the grinding throat. In a similar manner the free end of the unloading arm swings between an extreme position at the throat and an opposite extreme position away from the throat with the workpiece support pivoting on the arm, during swinging movement thereof, between a workpiece receiving position in the plane of the arms (to pick a workpiece off the blade) and a position out of the plane of the arms (to deposit a workpiece in the unloading chute which is spaced from the plane of the arms).

With the workpiece supporting fingers pivoting on the loading arm as the arm swings toward the grinding throat, a workpiece is moved from the loading chute, which is located out of the plane of the arms, into the grinding throat, which is located in the plane of the arms, in a continuous movement without abrupt direction changes. Rapid movement of the arm without loss of control of the workpiece can thus be effected, and introduction of the workpiece into the grinding throat with minimum expansion of the throat (and hence minimum loss of grinding time) is possible. Movement of the finished workpiece from the grinding throat is simultaneous with and similar to movement of the unoperated workpiece to the grinding throat.

Since workpiece clamping movement of the fingers is effected when the machine is not grinding, it is important that this operation be performed as quickly as possible, which means that the movement of the fingers between the open and closed positions should be as short as possible. Workpieces of different length must be carried by the handling mechanism so an improved finger actuating mechanism is provided by which predetermined movement of the fingers, in opposite directions, can be effected for gripping and releasing a workpiece and by which the zone of said predetermined movement of the fingers can be shifted, in opposite directions, to accommodate workpieces of different size.

In the preferred form of the invention the operating cycle of the loading and unloading mechanism is closely coordinated with the operating cycle of the machine to minimize time not spent in actual grinding. The arms are returned to their workpiece receiving positions simultaneously, the loading arm to the loading chute and the unloading arm to the grinding throat, during the grind so that when the piece is finished the arms are already in position to begin simultaneous loading and unloading. Preferably, the arms remain in the workpiece depositing positions with the fingers thereof closed until after abrading contact has begun so that the loading arm retains control over the workpiece until contact thereof by the grinding wheel.

It is therefore one object of the present invention to provide an improved, rapid, loading and unloading mechanism for a centerless grinding machine.

It is another object of the present invention to provide a loading and unloading mechanism for a centerless grinder in which workpieces are simultaneously loaded and unloaded from different sides of the grinding throat and with continuous movement without abrupt direction changes so that pieces can be moved rapidly without interference and without loss of control over the workpieces.

It is another object of the present invention to provide a mechanism for a centerless grinding machine which swings a workpiece from one side of the grinding throat down onto the blade in a predetermined position and which swings the workpiece up off the blade to the other side of the grinding throat so that workpieces which cannot be moved axially into and out of the grinding throat can be simultaneously loaded and unloaded.

It is yet another object to provide an improved mechanism for rapidly gripping and releasing workpieces which is adjustable to accommodate workpieces of different size.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is a fragmentary view, in elevation, of one side of a grinding machine showing the handling mechanism of the present invention;

FIG. 2 is a view similar to FIG. 1 but showing the opposite side of the grinding machine;

FIG. 3 is a view taken on line 3—3 of FIG. 1;

FIG. 4 is a view taken on line 4—4 of FIG. 3;

FIG. 6 is a view taken on line 6—6 of FIG. 5;

FIG. 7 is a view taken on line 7—7 of FIG. 4;

FIG. 8 is a view taken on line 8—8 of FIG. 1;

FIG. 9 is a view taken on line 9—9 of FIG. 3;

FIG. 10 is a view taken on line 10—10 of FIG. 3;

FIG. 11 is a view taken on line 11—11 of FIG. 10;

FIG. 14 is an enlarged view of the grinding throat, taken as the view of FIG. 1, showing the throat expanded and a workpiece in its retracted position therein.

Figure 5:
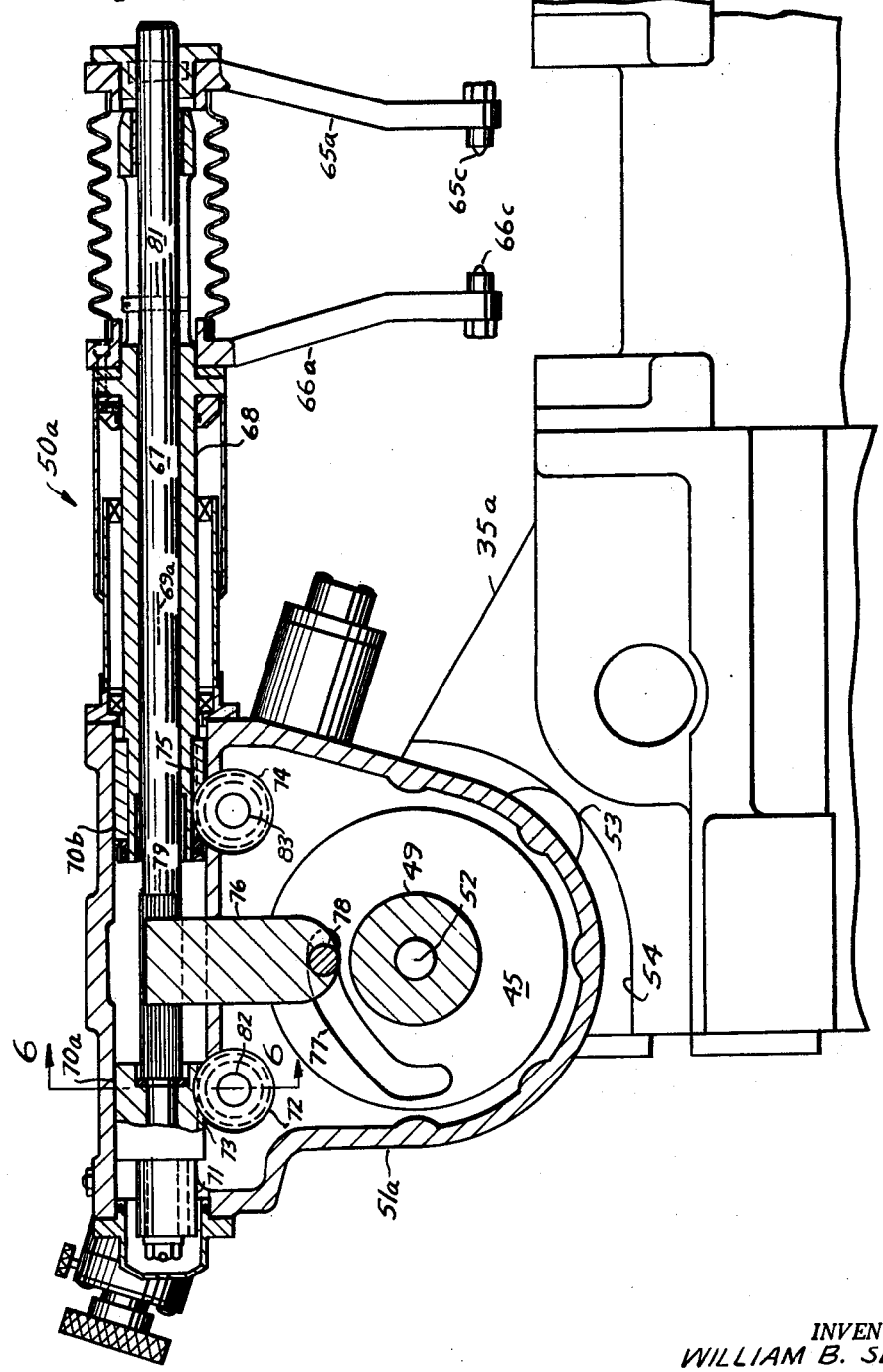
FIG. 5 is a view taken on line 5—5 of FIG. 4.

There is shown in FIGS. 1, 2 the bed 15 of a centerless grinding machine having mounted thereon a grinding wheel housing 16. The workpiece 17 shown for illustrative purposes is a cross shaped piece, as shown in FIG. 3, having two cylindrical surfaces of revolution 18 and 19 on an axis 20, to be ground simultaneously in the plunge grind operation described herein. There are therefore provided two spaced grinding wheels 21, 22, and opposite and in registration with the grinding wheels, two spaced regulating wheels 23, 24. The regulating wheels 23, 24 are mounted in a regulating wheel slide 25 which is mounted on a lower slide 26 for movement thereon towards and away from the grinding wheels.

The lower slide 26, which is movable on the base for adjustment towards and away from the grinding wheels, has, as shown best in FIG. 3, a base 27 secured thereto on the end toward the grinding wheel. The base 27 consists of two side sections 27a, 27b, and a center section 27c which extends upwardly and has mounted thereon a blade 28 extending up into the grinding throat 29 defined by the grinding and regulating wheels. The blade 28 has a pair of upstanding arms 28a adapted to support with the regulating wheels the surfaces 18 and 19 of the workpiece in the grinding throat. The grinding throat 29 is expanded, to permit loading and unloading of a workpiece, as the regulating wheels are moved away from the grinding wheels. This movement of the regulating wheels, which is effected by a short movement of the regulating wheel slide on the lower slide, shifts the workpiece on the blade arms, which have inclined upper surfaces, to a predetermined retracted position thereon, as shown in FIG. 14.

The side base sections 27a, 27b have inclined upper surfaces, as shown best in FIGS. 1 and 2. Base section 27a, which is on the operator, or front, side of the grinding throat, has mounted thereon the loading mechanism support member 35a, and the base section 27b, which is on the back side of the grinding throat, has mounted thereon the unloading mechanism support member 35b. As shown best in FIGS. 1 and 4, a shaft 36 extends through the base 27 and has two pinions 37 which are engaged with racks 38 on the bottom of the support members 35a, 35b so that by rotation of shaft 36 both support members can be adjusted in unison relative to the blade 28 for alignment relative to a workpiece in the retracted position in the grinding throat. A screw 39, also extending through base 27, is operable to actuate two wedge clamping members 40 which urge the respective support members 35a, 35b against base section 27c and down on base sections 27a and 27b to hold these support members firmly in their adjusted positions on the base.

As shown best in FIGS. 4 and 5 an annular cam member 45 is secured to the support member 35a, and the support member and cam member have ball bearings 46 mounted therein which rotatably support a shaft 47. The shaft has a segmental pinion 48 at one end and a flange 49 at the opposite end. A loading arm, indicated generally at 50a, has a housing 51a connected to shaft flange 49 so, when the shaft 47 is rotated, the arm housing 51a will rotate about the axis 52 of the shaft. The arm housing 51a has a guide 53 mounted thereon which engages a circular track 54 on the support member 35a to help support the loading arm as it swings on support member 35a.

Figure 12:
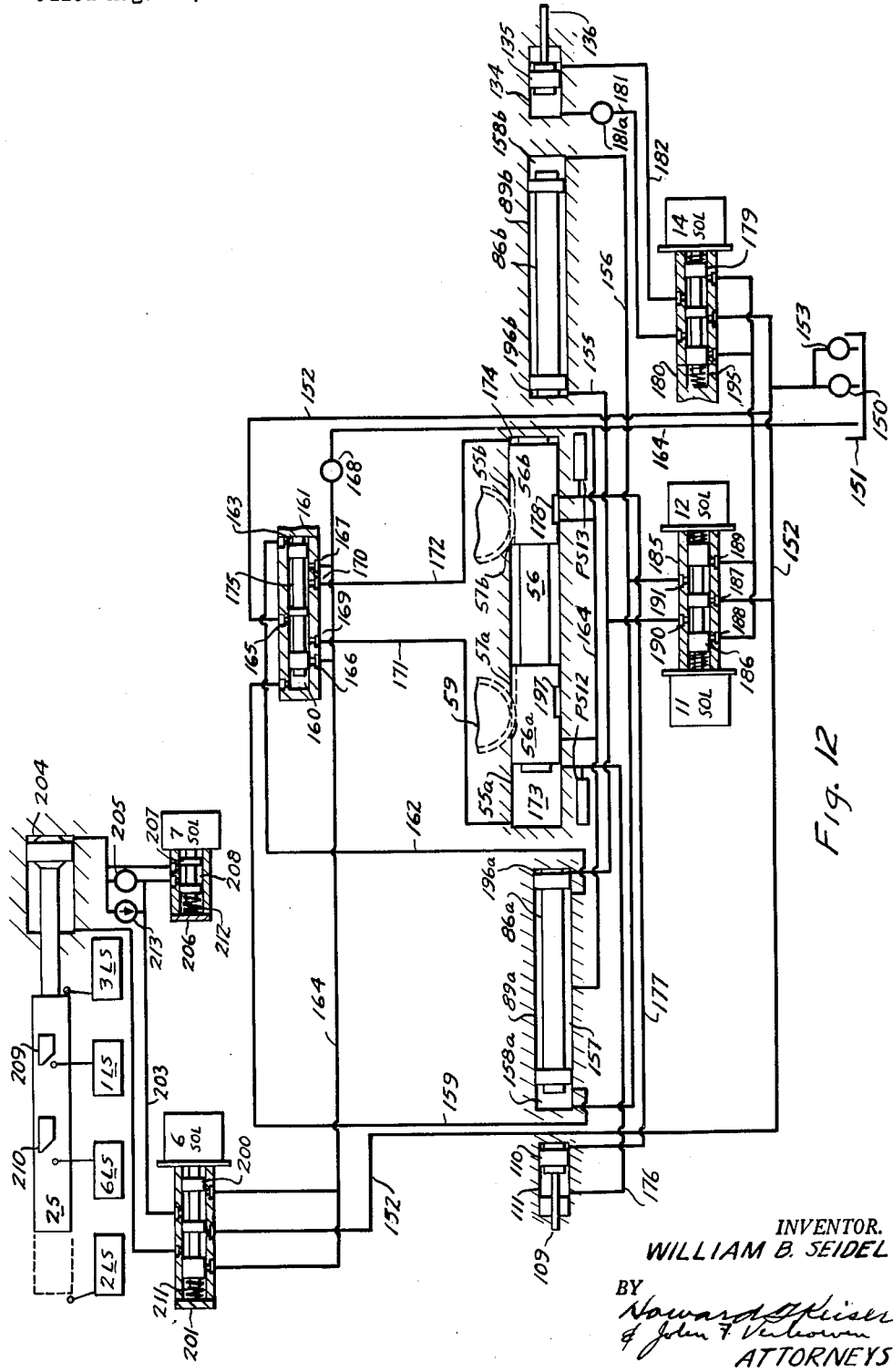
FIG. 12 is a schematic hydraulic diagram of the workpiece handling mechanism and the grinding machine feed mechanism.

As shown best in FIGS. 4, 7, and 12, the support member 35a defines a cylinder 55a which slidably receives a piston 56a mounted on piston rod 56 and having a rack 57a thereon. A shaft 58 journaled in base member 35a has two spaced gears 59 and 60 thereon. Gear 59 is engaged with the piston rack 57a, and gear 60 is engaged with an idler gear 61 mounted in the base member 35a. Idler gear 61 is engaged with pinion 48 on shaft 47 so that as the piston 56a moves the arm housing 51a is swung thereby. Adjustable stop pins 48a and 48b limit the rotation of pinion 48 and thereby define the extreme limits of movement of arm housing 51a and arm 50a.

As shown best in FIG. 5, the loading arm 50a has a pair of spaced fingers 65a, 66a, extending from the free end thereof. The fingers are movable towards and away from each other to clasp a workpiece on the ends and hold the workpiece with the axis 20 about which it is to be ground parallel to the arm. The arm comprises a pair of concentric telescoping shafts 67, 68 on an axis 69a, the inner shaft 67 extending beyond the outer shaft and having the finger 65a secured thereto, and the outer shaft 68 having the finger 66a secured thereto. The inner shaft 67 is journaled at one end in a sleeve 70a which is slidably received in the housing 51a and keyed thereto at 71 to prevent rotation thereof. Sleeve 70a is moved axially, to move inner shaft 67 axially, upon rotation of a pinion 72 engaged with rack 73 on sleeve 70a. Outer shaft 68 is similarly mounted in a sleeve 70b which is also keyed in housing 51a and movable axially in the housing 51a, to move shaft 68 axially, on rotation of a pinion 74 engaged with rack 75 on sleeve 70b.

As shown best in FIGS. 4 and 5, the arm housing has a follower 76 slidably received therein for movement radially relative to the shaft 47 on which the arm housing swings. The annular cam member 45 has a track 77 therein in which a roller 78, connected to one end of the follower, is received. The inner arm shaft 67 has an elongated pinion 79 which is engaged by a rack 80 on the follower. As the arm housing is swung around shaft 47, follower 76 is moved radially relative thereto to pivot arm shaft 67 about its axis 69a. Outer arm shaft 68, although movable axially relative to the inner arm shaft, is keyed thereto at 81 so that both shafts pivot together in the sleeves 70a, 70b, respectively, about axis 69a, thereby pivoting the fingers 65a, 66a secured thereto in unison about the axis of the arm.

Referring to FIGURE 5, it will be seen that simultaneous rotation of pinions 72 and 74 in opposite directions will cause the fingers to move towards or away from each other. Counterclockwise movement of pinion 72 and clockwise movement of pinion 74, as viewed in FIG. 5, will close the fingers to grasp a workpiece therebetween; clockwise movement of pinion 72 and counterclockwise movement of pinion 74 will spread the fingers to release a workpiece. Each of the pinions 72, 74 is secured on an intermediate shaft 82, 83 journaled in the arm housing and, as shown best in FIGS. 6 and 7, each shaft 82, 83 has a second pinion 84, 85 mounted thereon. Simultaneous rotation of shafts 82, 83 (and hence pinions 72, 74) is effected by means of a shaft, or rack piston, 86a mounted diagonally in the housing 51a between pinions 84 and 85 to define a finger actuating member. Rack piston 86a has two racks 87, 88 on opposite sides thereof engaged, respectively, with the pinions 84, 85 so that, as the piston is moved in one direction or the other, the pinions 84, 85 are oppositely rotated simultaneously, thereby simultaneously rotating the pinions 72, 74 to open or close the fingers.

The piston 86a is slidably received in a cylinder 89a defined by the housing 51a and slidably receives therein a rod 90 which extends through the cylinder 89a. Rod 90, which defines a stop member for the actuating member 86a, is slidably received in bushings 91, 92 secured in the cylinder 89. At one end the rod 90 is threadedly engaged with a nut 93 rotatably mounted at the outer end of bushing 91 so that on rotation of knob 94 secured to the rotatable nut, the rod 90 can be shifted axially. The rod 90 has two collars 95, 96 fixed thereon inboard of bushings 90, 91 and spaced apart less than the spacing between the inner faces of the bushing so that rod 90 can be axially shifted relative to the fixed bushings between limits defined by engagement of the collars with the respective inner faces of the bushings. The sleeve piston 86a is mounted on rod 90 between the collars 95, 96, and is shorter than the spacing between the collars, so that the piston can shift on the rod between limits defined by engagement of the ends of the pistons and the inner faces of the collars.

It will be noted that since axial movement of piston 86a serves to rotate pinions 84, 85 (and hence pinions 72, 74) in opposite directions (thereby moving the fingers toward or away from each other), any given axial position of the piston 86a will correspond to a given spacing between the fingers. The limited movement of piston 86a between collars 95, 96, which define stop members spaced a predetermined distance apart, will effect a movement of each finger through a limited predetermined zone, said movement being of sufficient extent to alternately grasp or release a workpiece. The zone of movement, however must occur at different positions of each finger relative to the other finger for workpieces of different length, and this adjustment is made by knob 94. Rotation of knob 94 shifts rod 90 and the collars 95, 96 fixed thereon axially. Thus the zone of movement of piston 86a is shifted axially, and the zone of movement of each finger is shifted accordingly toward or away from the other finger depending on the axial direction in which rod 90 is shifted.

As shown best in FIGS. 1, 3, 8, and 9, a loading chute 100 is mounted on the front side of the machine by means of an upwardly extending bar 101a connected to support member 35a. The chute 100 receives the cross shaped pieces between included U-shaped ways 102, 103 connected to a backing plate 104, with the axis 20 of the workpiece about which the piece is to be ground in a substantially vertical alignment. The backing plate 104 has connected thereto a pivotal crank 105 with a cross arm 106 to the ends of which are pivotally connected pins 107, 108 extending through plate 104. The crank is connected to a piston rod 109 which is connected to piston 110 received in cylinder 111 (see FIG. 12). As piston 110 is moved from one extreme position to the other in cylinder 111, the crank 105 is rotated to withdraw one of the pins 107, 108 from the path of the workpiece and advance the other of the pins 107, 108 into said path. Pin 107, when advanced into the chute, engages a workpiece immediately above the position where workpieces are taken out of the chute by the loading arm fingers, and pin 108, which advances into the chute between the workpiece held by pin 107 and the workpiece immediately thereabove as pin 107 retracts, holds upper workpieces as the workpiece previously held by pin 107 drops to the position for pickup by the loading arm fingers.

As the workpiece drops after release by pin 107, the forward end of the piece engages the stop pin 115, and that end of the piece is supported at the stop pin by support bracket 116. In this position of the workpiece, the rear end of the piece is supported by way 102, the side of which is cut away at 117 to permit the piece to be swung out of the loading chute. As shown best in FIG. 3, the loading chute leans slightly so that a piece at the bottom of the chute does not fall out. The upper and lower ends of the piece, which are the ends to be ground, are clear of the ways when the piece is in the lowermost position in the chute, and the loading arm fingers, which are open as they swing into registration with the upper and lower workpiece ends, close on these ends to clasp the piece. When the fingers are closed, protrusions 65c, 66c at the ends thereof are received in recesses in the ends of the piece and the piece is free to rotate in the fingers.

The support member 35b swingably carries an unloading arm 50b having a housing 51b constructed similarly to corresponding members of the loading mechanism. The arms 50a, 50b are mounted to swing in the vertical plane A through the grinding throat in which the axis 20 of a workpiece 17 on the blade 28 lies when the throat 29 is expanded. The hub 51b is engaged with rack 57b of piston 56b which is carried on piston rod 56 (see FIG. 12) in the same manner as hub 51a is engaged with rack 57a so that the movement of the unloading arm 50b is coordinated with the movement of the loading arm 50a. When the unloading arm is positioned in a substantially horizontal position with the fingers thereof at the blade, the loading arm is raised with the fingers at the loading chute. As the free end of the loading arm swings down toward the grinding throat, the free end of the unloading arm swings up and the fingers thereof pivot out of the plane of the arms and towards an unloading chute 120 spaced from said plane. When the fingers 65a, 66a of the loading arm are in the grinding throat 29, the fingers 65b, 66b of the unloading arm are at the unloading chute 120.

The unloading chute 120 provides controlled ejection of a finished, or operated, workpiece from the machine. Controlled movement of the finished workpiece from the machine requires that the piece not be merely dropped but, instead, that it be supported at least until the fingers have completely cleared the piece. The unloading chute has upper and lower spaced, inclined, U-shaped ways 121 122 connected to a backing plate 123 mounted on support bar 101b, which, in turn, is connected to support 35b. The lower way 122 is positioned relative to the terminal position of the fingers 65b, 66b so that one edge of the lower end of the workpiece stops immediately above an upper corner 124 of the way. An upper workpiece receiving member, designated generally at 125, has a base 126, a side plate 127 connected to one side of the base, and an upper member 128 connected to the side plate. The base and upper member have extending strips 129, 130, respectively, to which are connected two guide sections, a lower guide section 131 and an upper guide section 132.

The upper workpiece receiving member 125 is mounted at the upper end of two upstanding flexible strips 125a, 125b connected at their lower ends to the backing plate so that the guide sections are above the way sections connected to the backing plate. With this construction the member 125 can be laterally shifted from a position where the guide sections 131, 132 thereof are displaced from the inclined way sections 121, 122 connected to the backing plate, as shown in FIG. 10, to a position where the guide sections 131, 132 are aligned with the fixed way sections 121, 122. The guide sections 131, 132 on movable member 125 are cut away to permit a workpiece to swing into the guide sections with the end of the workpiece above corner 124 of fixed way 122 when the movable member 125 is in the position shown in FIG. 10. The upper movable guide section 132 defines a slot 133 into which the upper end of the workpiece is received. A workpiece moving into member 125 is prealigned by guide 138 and then pivoted into the position shown by a yieldable guide arm 139. Guide arm 139 extends from a block 140 pivotally received on pin 141 between base 126 and upper member 128. The block 140 is pivotally urged against pin 142 by spring 143 to urge guide arm 139 to a position parallel to the desired alignment of a workpiece. When the fingers 65b, 66b open, the workpiece is supported by corner 124 and slot 133, the unloading chute leaning slightly to prevent the piece from dropping out of slot 133. A hydraulic cylinder 134 is connected to the backing plate and the piston 135 slidably received therein (see FIG. 12) has a rod 136 connected by link 137 to the base 126 of movable member 125. When the rod 136 is retracted, the movable member 125 is shifted to align the guide sections 131, 132 thereof with the ways 121, 122 fixed on the backing plate. At this time the workpiece slides down between the fixed ways tripping limit switch 10LS as it descends.

Figure 13:
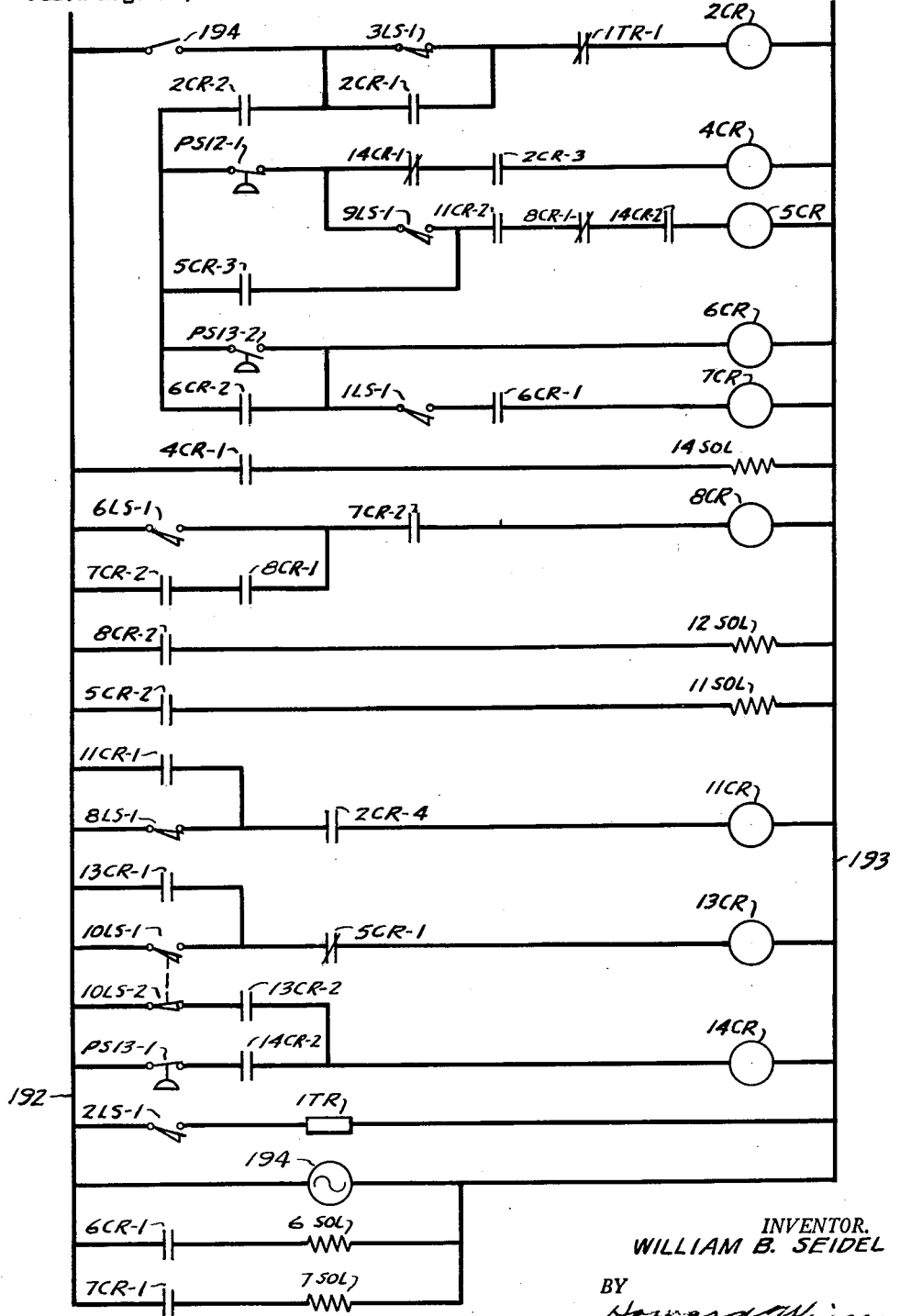
FIG. 13 is an electrical diagram for operation of the hydraulic mechanism of FIG. 12.

The operation of the loading and unloading mechanism can best be understood by reference to the hydraulic and electrical diagrams shown in FIGS. 12 and 13. The hydraulic circuit for the mechanism has a pump 150 which takes fluid from a sump 151 and delivers it under pressure to pressure line 152, a relief valve 153 being connected between the pressure line and the sump. The hydraulic motor comprising cylinder 89a and sleeve piston 86a, which controls operation of the fingers of the loading arm, and a similar hydraulic motor which consists of cylinder 89b and sleeve piston 86b, are connected in parallel with the inboard ends thereof connected by line 155 and the outboard ends connected by line 156. The piston 86a has an annular groove 157 and, in cooperation with ports in cylinder 89a, operates as a valve. When the finger pistons 86a and 86b are in their inner positions, line 156 is connected through chamber 158a of cylinder 89a with a line 159 leading to end chamber 160 of an arm control valve 161. At the same time a line 162 leading from the opposite end chamber 163 of valve 161 is connected to return line 164 through groove 157 on piston 86a. Control valve 161 has a pressure port 165 connected to pressure line 152, and two discharge ports 166, 167 connected through throttle valve 168 to return line 164. The control valve 161 also has two motor ports 169, 170 connected, respectively, by lines 171 and 172 to end chambers 173, 174 of arm cylinders 55a, 55b. When the shiftable valve member 175 of the control valve 161 is at the right in the position shown, chamber 173 is connected to pressure line 152 through line 171 and valve 161, and the chamber 174 is connected to return line 164 through line 172 and valve 161. When the arm pistons 56a and 56b (which, with cylinders 55a, 55b, define the arm motor) are in the positions shown in FIG. 12, the loading arm 50a is up (with the fingers thereof at the loading chute) and the unloading arm 50b is down (with the fingers thereof at the blade). At this time pressure from chamber 173 is connected through line 176 to one end of the loading chute cylinder 111, and the other end of that cylinder is connected through line 177 and a groove 178 in piston 56b to return line 164, thereby holding piston rod 109 retracted. When solenoid 14SOL of valve 180 is deenergized, and valve member 179 is in the position shown, one end of cylinder 134 at the unloading chute is connected to pressure line 152 through the valve 180 and line 181 containing throttle valve 181a. At this time the opposite end of the cylinder 134 is connected through line 182 and valve 180 to return line 164, thereby holding the piston rod 136 advanced. This holds the shiftable upper portion 125 of the unloading chute in position to receive a workpiece. Pressure responsive switch PS12 is connected to line 176 and is operated when the arm piston 56a is in the position shown. Pressure switch PS13 is connected to line 177 and is released when the arm piston 56b is in the position shown.

A finger clamping control valve 185 is provided which has a spring centered movable valve member 186 shiftable in one direction or the other from the position shown in FIG. 12 by solenoids 11SOL and 12SOL. The valve has a pressure port 187 connected to pressure line 152, and two discharge ports 188, 189 connected to return line 164. One motor port 190 of the valve is connected through line 155 to the inner ends of both finger clamping cylinders 89a, 89b, and the other motor port 191 is connected through line 156 to the outer ends of these two cylinders.

In the description of the electrical circuit, the contacts are given numbers corresponding to the relays by which the contacts are operated, each contact being given a suffix to distinguish it from other contacts operated by the same relay. The relays and solenoids are connected between lines 192 and 193 for energization from a source 194 across which these lines are connected. Limit switch 3LS is operated when the regulating wheel slide 25 is fully retracted so that when the slide is retracted, and the switch 194 is closed, relay 2CR is energized through the contacts of switch 194, the normally open contacts 3LS-1 of limit switch 3LS, and the normally closed contacts 1TR-1 of a timer 1TR. Relay 2CR is sealed around limit switch contact 3LS-1 by its normally open contact 2CR-1. When the two arms reached their pickup positions at the end of the previous cycle (loading arm 50a up; unloading arm 50b down) the arm piston stopped in the position shown in FIG. 12 with pressure switch PS12 operated. At this time a workpiece previously deposited by the unloading arm is on the shiftable workpiece receiving portion 125 of the unloading chute 120, and the portion 125 is in its holding position out of alignment with the fixed ways 121, 122 of the chute 120 thereof. At this time relay 14CR is deenergized so that relay 4CR is picked up through the normally open contact 2CR-2, normally open contact 2CR-3, normally open contact PS12-1, and the normally closed contact 14CR-1.

When relay 4CR is energized, the normally open contact 4CR1 thereof is closed to energize solenoid 14SOL. This shifts valve plunger 179 of valve 180 to the left of the position shown in FIG. 12, connecting pressure line 152 to line 182 leading to the unloading chute cylinder, and connects the line 181 therefrom to return line 164. Rod 136 retracts and the finished piece is shifted laterally to drop between ways 121 and 122, momentarily operating limit switch 10LS as it descends between the two ways. This closes the normally open contact 10LS–1 of limit switch 10LS and, since the normally closed contact 5CR–1 of relay 5CR is closed at this time, relay 13CR is energized. Relay 13CR is sealed in by contact 13CR–1 connected across limit switch contact 10LS–1. Contact 13CR–2 closes when relay 13CR is energized, and when normally closed contact 10LS2 of limit switch 10LS closes after the momentary operation of the limit switch, relay 14CR is energized. An additional energizing path containing normally closed contacts PS13–1 (which are closed at this time) and normally open contacts 14CR–2, is provided. When relay 14CR is energized, normally closed contact 14CR–1 opens, releasing relay 4CR and deenergizing solenoid 14SOL. Spring 195 of valve 180 shifts the valve member 179 back to the position shown in FIG. 12 to again extend the rod 136 of cylinder 134 and reposition the workpiece receiving portion 125 of the unloading chute 120 in a position to receive a finished workpiece. In this position of the shiftable portion of the unloading chute, limit switch 8LS is operated, and the normally open contact 8LS–1 thereof is closed. Since normally open contact 2CR–4 is closed at this time, relay 11CR is energized and sealed in around contact 8LS–1 by contact 11CR–1.

With a part situated between pins 107 and 108 of the loading chute 100, limit switch 9LS is operated and normally open contact 9LS–1 thereof is closed. Thus, when relay 11CR is energized on the return of member 125 to its workpiece receiving position, relay 5CR is energized (since relay 14CR is now energized) through normally open contact 9LS–1, normally open contact 11CR–2, normally closed contact 8CR–1, and normally open contact 14CR–2. Relay 5CR is sealed in around contacts PS12–1 and 9LS–1 by its own normally open contacts 5CR–3. When relay 5CR is energized, the normally closed contact 5CR–1 opens, and relay 13CR is dropped, leaving relay 14CR energized through normally closed contacts PS13–1 and normally open contacts 14CR–2. With relay 5CR energized, normally open contact 5CR–2 thereof is closed to energize 11SOL and shift valve member 186 of valve 185 to the right of the position shown in FIG. 12. This connects the inner chambers 196a and 196b of the finger clamping cylinders 89a, 89b to pressure and the outboard chambers 158a, 158b thereof to exhaust so that the pistons 86a, 86b shift outwardly.

As the finger clamping pistons 86a, 86b shift outwardly, the fingers on both arms close, the fingers on the loading arm grasping a piece at the loading chute and the fingers of the unloading arm grasping a piece on the blade in the throat 29. After the fingers are closed, line 162 is connected to line 155 through inner end chamber 196a, thereby placing pressure in end chamber 163 of valve 161. At the same time, line 159 is connected to return line 164 through groove 157 of the clamping cylinder 89a, and the valve member 175 of valve 161 is thereby shifted to its extreme left hand position. In this position of valve member 175, the pressure line 152 is connected to line 172 through the valve 161 and pressure is introduced to end chamber 174 of the arm cylinder. The opposite end chamber 173 of the arm cylinder 55a is connected by line 171 and valve 161 to return line 164.

As the arm pistons move to the left under these pressure conditions, the loading arm 50a swings toward the blade in the grinding throat with an unoperated workpiece, and the unloading arm 50b swings toward the unloading chute with an operated workpiece. As the arms swing the fingers extending therefrom pivot about the axis 69a of the arms, the fingers on the loading arm pivoting into the plane of the arms which intersects the throat and the fingers on the unloading arm pivoting out of that plane toward the unloading chute. When the arm pistons reach their left hand positions, line 176 is connected to return line 164 through groove 197 in piston 56a. At the same time, line 177 is connected to pressure through chamber 174, line 172, valve 161, and pressure line 152. Pressure switch PS12 is released and pressure switch PS13 is operated under these pressure conditions. With these connections, the loading chute piston rod 109 is advanced, extending pin 108 and retracting pin 107 to release a piece from between the pins to a pick-up position against stops 115 and 116. Limit switch 9LS is released as a piece slides from between the pins and contacts 9LS–1 open.

With pressure switch PS12 released and PS13 operated, normally open contact PS12–1 opens, normally closed contact PS13–1 opens, and normally open contact PS13–2 closes. This deenergizes relays 14CR and 5CR, and hence solenoid 11SOL and energizes relay 6CR which, through contact 6CR–1, energizes solenoid 6SOL. Energization of 6SOL shifts valve member 200 of valve 201 to the left of the position shown in FIG. 12 and thereby connects pressure line 152 to line 203. Line 203 is connected to one end of the motor 204 which moves regulating wheel slide 25 and contains a throttle valve 205 therein. A valve 206 is connected across the throttle valve 205, and while 7SOL of valve 206 is deenergized, and the valve member 207 thereof is to the right as shown, fluid under pressure can flow through groove 208 to the cylinder to rapidly advance the slide 25.

When limit switch 1LS, mounted on lower slide 26, is operated by dog 209, mounted on regulating wheel slide 25, relay 7CR is energized through contacts PS13–2 normally open contact 1LS1 and normally open contact 6CR–1. Relays 6CR and 7CR are sealed around contacts PS13–2 by normally open contacts 6CR–2. This energizes solenoid 7SOL through normally open contact 7CR1 to shift valve member 207 to the left and terminate unrestricted fluid flow to motor 204. All flow to the motor now occurs through throttle valve 205 to advance the slide at a feed rate. Limit switch 6LS is also mounted on the lower slide 26 and initiates the release of the fingers, when operated by dog 210 on the slide 25, after feeding movement of the table has begun. Preferably limit switch 6LS is operated after the piece has made contact with the grinding wheel to assure that the grinding wheel and regulating wheel have established control over the piece before the fingers are released. When limit switch 6LS is operated by dog 210, normally open contacts 6LS–1 thereof are closed and relay 8CR is energized through contacts 6LS–1 and normally open contacts 7CR2, relay 8CR being sealed in around contact 6LS–1 by normally open contact 8CR–1 and 7CR–2. Contact 8CR–2 closes to energize solenoid 12SOL, thereby shifting valve member 186 to the left. This connects line 156 to pressure line 152 and line 155 to return line 164. This shifts the finger clamping pistons inwardly to open both the loading and unloading fingers. After the clamping pistons are at their inner positions as shown, line 159 is connected to pressure through chamber 158a and line 162 is connected to return through groove 157 and line 164. Thus valve member 175 is shifted to the right (to the position shown) connecting pressure line 152 to line 171 and connecting line 172 to return line 164. This shifts the arm pistons to the right to swing the loading arm 50a up and the unloading arm 50b down during grinding so that the loading arm is in a position to pick up an unoperated workpiece and the unloading arm is ready to pick up the operated piece as soon as the grinding operation is finished. As the arm pistons reach their right hand positions, line 176 is connected to pressure and line 177 connected to return to retract plunger 109, retracting pin 108 and extending pin 107, to permit a piece to slide down to pin 107.

When the slide 25 has fully advanced, limit switch 2LS (mounted on lower slide 26) is operated by the upper slide 25 thereby closing normally open contact 2LS–1 and energizing timer 1TR. Normally closed contacts 1TR–1 of the timer remains closed for a predetermined time to allow sparkout and then momentarily opens. This drops relay 2CR to deenergize relays 6CR, 7CR, 8CR, and 11CR, thereby deenergizing solenoids 6SOL and 7SOL. Valve member 200 of valve 201 is shifted to the right by spring 211 and valve member 207 of valve 206 is shifted to the right by spring 212. With the valve member 200 in the right hand position, the slide motor 204 is reversed and the slide is retracted. Unrestricted discharge from motor 204 occurs through check valve 213.

What is claimed is:

1. In a centerless grinding machine having a grinding wheel and having a regulating wheel opposite to and spaced from the grinding wheel to define a grinding throat therebetween, the combination comprising a pair of arms each having a pivotal workpiece support at one end, the opposite ends of said arms pivotally connected on opposite sides of the grinding throat for swinging the workpiece support to and from the throat, means to swing the arms simultaneously to move one workpiece support toward the throat as the other workpiece support moves away from the throat, and means to pivot the workpiece supports as the arms are swinging.

2. In a centerless grinding machine having a grinding wheel and having a regulating wheel opposite the grinding wheel to define a grinding throat therebetween, said machine having a blade in the throat to receive a workpiece for grinding therein, the combination comprising a pair of arms each having a workpiece support at one end pivotal on the arm, the opposite ends of said arms pivotally connected on opposite sides of the grinding throat in a common plane extending through the grinding throat, one of said arms swingable in said plane to carry a workpiece on the support thereof down onto the blade from one side of the grinding throat, and the other arm swingable in said plane to carry a workpiece on the support thereof up off the blade to the other side of the grinding throat, reversible power operated means to swing said arms in unison to move said one arm toward the grinding throat as said other arm moves away from the grinding throat and reversely to move said one arm away from the grinding throat as said other arm moves toward the grinding throat, and means to pivot the workpiece supports on the arms into and out of the plane of the arms as the arms are swung, respectively, to and from the grinding throat.

3. In a centerless grinding machine having a grinding wheel and having a regulating wheel opposite the grinding wheel to define a grinding throat therebetween, said wheels relatively movable to expand said throat for loading and unloading and contract said throat for grinding, said machine having a blade in the throat to support a workpiece for rotation about a horizontal axis during grinding, said blade and one of said wheels operable to support a workpiece in the throat when the throat is expanded, the combination comprising a loading arm swingable about one end on one side of the grinding throat in a vertical plane extending through the grinding throat, an unloading arm swingable about one end on the other side of the grinding throat in said vertical plane, the opposite ends of said arms each having a workpiece support extending therefrom and pivotal into and out of said plane, each of said arms swingable between a position with said opposite ends away from the grinding throat and a substantially horizontal position with said opposite ends above the grinding throat, a reversible motor operatively connected to said arms to swing the arms in unison, one of said arms swinging down to the substantially horizontal position as said other arm swings up from the horizontal position, and means to pivot said workpiece supports as the arms swing to pivot each support into said plane as each arm moves toward the substantially horizontal position and to pivot each support out of said plane as each arm moves away from the substantially horizontal position.

4. In a centerless grinding machine having a grinding wheel and having a regulating wheel opposite the grinding wheel to define a grinding throat therebetween, said wheels relatively movable to expand said throat for loading and unloading and contract said throat for grinding, said machine having a blade in the throat to support a workpiece for rotation about a horizontal axis during grinding, said blade and one of said wheels operable to support a workpiece in the throat when the throat is expanded, the combination comprising a support on each side of the grinding throat, a loading arm and an unloading arm each having a pair of spaced aligned fingers extending from one end, said fingers of each arm adapted to hold a workpiece with said axis of rotation parallel to the arm, means connecting the opposite ends of the loading arm and the unloading arm, respectively, to said supports for swinging of said arms in a plane passing through the grinding throat, said arms swingable between a horizontal position with the fingers at the grinding throat and a position away from the grinding throat, a loading chute on one side of the grinding throat and spaced from said plane, an unloading chute on the other side of the grinding throat and spaced from said plane, means coordinated with the movement of each arm to pivot the fingers about the arm, said fingers pivoting into said plane as the arms move toward the grinding throat and pivoting out of said plane and towards the chutes as said arms move away from the grinding throat, and a reversible motor operatively connected to said arms to swing said arms in unison, one of said arms swinging down to the horizontal position as said other arm swings up from the horizontal position.

5. In a centerless grinding machine having a grinding wheel and having a regulating wheel opposite the grinding wheel to define a grinding throat therebetween, said wheels relatively movable to expand said throat for loading and unloading and contract said throat for grinding, said machine having a blade in the throat to support a workpiece for rotation about a horizontal axis during grinding, said blade and one of said wheels operable to support a workpiece in the throat when the throat is expanded, the combination comprising a support on each side of the grinding throat, a loading arm and an unloading arm each having a pair of spaced aligned fingers extending from one end, the fingers of each arm relatively shiftable on the arm and adapted when closed to hold a workpiece with said axis of rotation parallel to the arm, a pair of shafts journaled in said supports, respectively, and receiving the opposite ends of said loading and unloading arms, respectively, for swinging of said arms on opposite sides of the grinding throat in a plane extending through the grinding throat, said arms swingable between a horizontal position with the fingers at the grinding throat and a raised position away from the grinding throat, a loading chute to hold unoperated workpieces on one side of the grinding throat and spaced from said plane, an unloading chute to receive operated wiorkpieces on the other side of the grinding throat and spaced from said plane, means including a cam on each of said shafts and a follower operatively connected to the fingers to pivot the fingers about the arms as the arms are swung, said means pivoting the fingers into said plane to extend toward the blade as the arms move toward the grinding throat and pivoting the fingers out of said plane and towards the chutes as said arms move away from the grinding throat, a reversible motor operatively connected to said arms to swing said arms in unison, one of said arms bringing the fingers thereof to the blade as the other of said arms brings the fingers thereof to one of said chutes, and means to close both pair of fingers when the fingers of the loading arm are at the loading chute and the fingers of the unloading arm are at the blade and to open both pair of fingers when the fingers of the loading arm are at the blade and the fingers of the unloading arm are at the unloading chute.

6. In a centerless grinding machine having a grinding wheel and having a regulating wheel opposite the grinding wheel to define a grinding throat therebetween, said wheels relatively movable to expand said throat for loading and unloading and contract said throat for grinding, the combination comprising a loading arm on one side of the throat and an unloading arm on the other side thereof, each of said arms having a pair of fingers operable to open and close on a workpiece for grasping and releasing said workpiece, the loading arm swingable between a workpiece receiving position with the fingers thereof away from the throat and a workpiece depositing position with the fingers thereof at the throat and the unloading arm swingable between a workpiece receiving position with the fingers therof at the throat and a workpiece depositing position with the fingers thereof away from the throat, means responsive to the opening of the fingers to swing said arms in unison to their workpiece receiving positions and responsive to the closing of the fingers to swing said arms in unison to their workpiece depositing positions, means responsive to the arrival of the arms in their workpiece depositing positions to initiate contraction of the grinding throat, and means operable when the arms are in their workpiece depositing positions to open the fingers and operable when the throat is expanded to close said fingers.

7. In a centerless grinding machine having a grinding wheel and having a regulating wheel opposite the grinding wheel to define a grinding throat therebetween, said wheels relatively movable to expand said throat for loading and unloading and contract said throat for grinding, said machine having a blade in the throat operable with one of said wheels to support a workpiece in the throat, the combination comprising a loading chute on one side of the throat and an unloading chute on the other side thereof, a loading arm on said one side of the throat and an unloading arm on said other side of the throat, each of said arms having a pair of fingers operable to open and close on a workpiece for grasping and releasing said workpiece, the loading arm swingable between a workpiece receiving position with the fingers thereof at the loading chute and a workpiece depositing position with the fingers thereof at the throat and the unloading arm swingable between a workpiece receiving position with the fingers thereof at the grinding throat and a workpiece depositing position with the fingers thereof at the unloading chute, a hydraulic motor operatively connected to said arms operable to swing the arms in unison to their workpiece depositing positions in response to closing of the fingers and to swing the arms in unison to their workpiece receiving positions in response to opening of the fingers, means operable in response to expansion of the grinding throat to close the fingers of the arms and operable during the grind on the workpiece to open the fingers, and means responsive to the arrival of the arms in their workpiece depositiong positions to initiate contraction of the grinding throat.

8. In a centerless grinding machine having a grinding wheel and having a regulating wheel opposite the grinding wheel to define a grinding throat therebetween, said wheels relatively movable together and apart to contract said throat for grinding and expand said throat for loading and unloading, said machine having a blade in the throat operable with one of said wheels to support a workpiece in the throat, the combination comprising a loading arm on one side of the throat and an unloading arm on said other side of the throat, each of said arms having a pair of fingers operable to open and close on a workpiece for grasping and releasing said workpiece, a loading chute on said one side of the throat operable to present pieces one at a time for grasping by the fingers of the loading arm, an unloading chute on the other side of the throat operable to receive and hold a workpiece for release by the fingers of the unloading arm, means to mount said arms for swinging and pivoting of the fingers, the loading arm fingers movable between a workpiece receiving position at the loading chute and a workpiece depositiong position at the blade in the throat and the unloading arm fingers movable between a workpiece receiving position at the blade in the throat and a workpiece depositing position at the unloading chute, means including a hydraulic motor defining a valve to close the fingers of the arms at their workpiece receiving positions in response to expansion of the grinding throat, means including a hydraulic motor operable by the actuation of the valve-defining finger motor to swing the arms in unison to their workpiece depositing positions when the fingers close and reversely swing the arms in unison to their workpiece receiving positions when the fingers open, means responsive to the arrival of the arms in their workpiece despositing positions to initiate contraction of the grinding throat, and means operable after abrading contact is made with the workpiece and during the grind thereon to reversely operate the finger motor to open the fingers.

9. In a machine tool, mechanism for clamping and releasing workpieces of different size with a predetermined amount of clamping and releasing movement comprising in combination a pair of relatively shiftable members adapted to engage, respectively, opposite ends of a workpiece, an actuating member operatively connected to both of said shiftable members to move said members equally but in opposite directions on movement of said actuating member, a stop member operable to limit the range of movement of said actuating member to a predetermined amount, and means to shift said stop member to shift the zone of said predetermined limited movement of the actuating member.

10. In a machine tool, mechanism for clamping and releasing workpieces of different size with a predetermined amount of clamping and releasing movement comprising in combination a pair of relatively shiftable telescoping members each having a finger extending therefrom, an axially shiftable actuating member operatively connected to both of said telescoping members for movement thereof in opposite directions on axial movement of said actuating member, an axially shiftable stop member having a pair of spaced stops straddling said actuating member to limit the range of movement thereof to a predetermined amount, and means to shift said stop member axially to shift the zone of said predetermined limited movement of the actuating member.

11. In a machine tool, mechanism for transporting workpieces of different size and operable to grasp said workpieces at a first predetermined position and release said workpieces at a second predetermined position comprising in combination a housing, a first shaft having a first rack carried thereby and slidably received in the housing, a first finger extending from said first shaft, a second shaft having a second rack carried thereby and slidably received in the first shaft, a second finger extending from said second shaft, a first pinion secured on a first intermediate shaft and engaged with said first rack, a second pinion secured on a second intermediate shaft and engaged with said second rack, an actuating member slidably mounted in said housing and operatively engaged with both of said intermediate shafts to rotate said shafts and move said first and second shafts in opposite directions, an axially shiftable stop member mounted in said housing having a pair of spaced stops fixed thereon a predetermined distance apart greater than the length of said actuating member, said stops adapted to engage the opposite ends of said actuating member one at a time to limit the range of movement thereof to thereby limit the range of opening and closing movement of the fingers relative to a workpiece received therebetween, means to shift said stop member axially in the housing to shift the zone of movement of said actuating member and thereby shift in opposite directions, respectively, the zone of opening and closing movement of said fingers to accommodate workpieces of different size, means to move the housing to move the fingers between said first predetermined position and said second predetermined position, and means to move the actuating member against one of said stop members when the fingers are at said first predetermined position and move the actuating member against the other of said stop members when the fingers are at said second predetermined position.

12. In a machine tool, mechanism to grasp a workpiece in a first position on an axis of a first predetermined orientation in a first plane and transport said workpiece to a second position on an axis of a second predetermined orientation in a second plane for release thereof comprising in combination a fixed support, a housing rotatably mounted on said support, a first elongated member slidably received in the housing for axial and rotational movement therein, said first member having a finger extending therefrom, a second elongated member slidably received in the first member for axial movement relative thereto, said second member fixed against rotation relative to the first member and having a finger extending therefrom in registration with said first finger, said fingers adapted when closed to hold a workpiece on an axis, a pinion secured to one of said elongated members, a follower slidably mounted in the housing and having a rack thereon engaged with said pinion, a cam mounted on said support and engaged with said follower for movement thereof on rotation of the housing, means to rotate the housing to swing the fingers from said first position to said second position, the orientation of the axis of a workpiece held thereby changing from said first predetermined orientation to said second predetermined orientation, said follower moving as the housing rotates to pivot the fingers and pivot a workpiece held thereby from said first plane to said second plane, an actuating member mounted in the housing operatively engaged with both of said elongated members and operable when moved to move said elongated members in opposite directions, means to move said actuating member in one direction when the fingers are at said first position to close the fingers on a workpiece and move said actuating member in the opposite direction when the fingers are at the second position to release a workpiece therefrom.

References Cited in the file of this patent
UNITED STATES PATENTS

| | | |
|---|---|---|
| 1,794,424 | Smith et al. | Mar. 3, 1931 |
| 2,217,333 | Dahlman | Oct. 8, 1940 |
| 2,570,660 | Gamble | Oct. 9, 1941 |
| 2,912,798 | Seidel et al. | Nov. 17, 1959 |
| 3,028,020 | Peras | Apr. 3, 1962 |